United States Patent Office 3,280,120
Patented Oct. 18, 1966

3,280,120
SUBSTITUTED BENZOXAZINES, PROCESS THEREFOR AND INTERMEDIATES
Francis J. Petracek, Canoga Park, Calif., assignor to Rexall Drug and Chemical Company, Los Angeles, Calif., a corporation of Delaware
No Drawing. Filed Mar. 9, 1964, Ser. No. 350,575
5 Claims. (Cl. 260—244)

This invention relates to compositions of matter classified in the art of chemistry as substituted benzoxazines as well as to a process for their preparation and to intermediates obtained in the synthesis thereof.

The invention sought to be patented, in its final product composition aspect, resides in the concept of a 4-phenyl-4H-3,1-benzoxazine-2-one having the formula

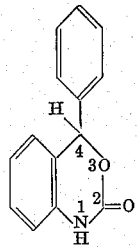

and to its hereinafter described equivalents.

The invention sought to be patented, in its intermediate product composition aspect, also resides in the concept of o-carbobenzoxamidobenzhydrol having the formula

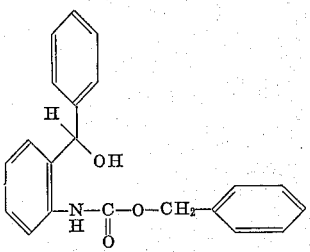

and to its hereinafter described equivalents.

The invention sought to be patented, in a first process aspect, resides in the concept of treatment of o-aminobenzhydrol or its hereinafter described equivalents with carbobenzoxy chloride or its hereinafter described equivalents to form the tangible embodiments of this invention in its intermediate product composition aspect, and treating the so-formed intermediate with an acid-forming catalyst to form the tangible embodiments of this invention in its final product composition aspect.

The invention sought to be patented, in a second process aspect, resides in the concept of treatment of o-aminobenzhydrol or its hereinafter described equivalents with phosgene to form the tangible embodiments of this invention in its final product composition aspect.

As used throughout the specification and in the claims the terms "lower alkyl" and "lower alkoxy" embrace straight and branched chain alkyl and alkoxy groups, respectively, containing from 1 to 6 carbon atoms and the term "halogen" includes chloro-, bromo- and fluoro groups.

The tangible embodiments of this invention possess the general physical characteristics of being solid crystalline materials. These physical properties taken with spectral and analytical data, together with the structure of the starting material and mode of synthesis positively confirm the structure of the compounds sought to be patented.

The tangible embodiments of this invention, in its final product composition aspect, possess the applied use characteristics of having significant pharmacological activity in depressing the central nervous system as determined by recognized and accepted pharmacological test procedures, and, in its intermediate composition aspect, are useful in chemical synthetic procedures in making the final products as described hereinafter.

The manner and process of making and using the invention will now be generally described so as to enable a person skilled in the art of chemistry to make and use the same as follows:

The starting material for the prepartion of the compounds of this invention is o-amino-benzhydrol having the formula:

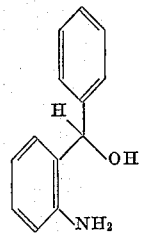

and its hereinafter described equivalents. The above starting material is conveniently prepared by treating o-amino-benzophenone with sodium borohydride.

The starting material so obtained is converted to the tangible embodiments of this invention, in its intermediate and final product composition aspects, by means of the reaction sequence depicted as follows:

REACTION SEQUENCE

Starting materials in which the phenyl groups are substituted individually or collectively with one to three lower alkyl, lower alkoxy or halogen groups and/or in which the amine group bears a lower alkyl substituent are readily obtained by the treatment of an appropriately substituted o-aminobenzophenone with sodium borohydride and are the full equivalents to o-aminobenzhydrol in the two process aspects of this invention and their use in such processes results in the preparation of substituted compounds which have the same utility as the intermediate and final product depicted hereinabove. In addition, the carbobenzoxy group on the intermediate can be replaced by other readily hydrolyzable amine protecting groups, for example a carbo-tert-butoxy group, and such intermediates are the full equivalent of the specific intermediate depicted hereinabove in the reaction with thionyl chloride to yield the finished product.

The initial step in the reaction sequence in accordance with the first process aspect of this invention involves the introduction onto the nitrogen atom of the starting material of an easily hydrolyzable amine protecting group such as the carbobenzoxy or t-butoxycarbamoyl group. The introduction of the amine protecting group is accomplished by treating the o-amino-benzhydrol starting material with the protecting group in the form of its chloride, for example, carbobenzoxy chloride, in the presence of dilute alkali according to the conditions of the well-known Schotten-Baumann reaction.

The nitrogen-substituted compounds thus obtained, comprising the tangible embodiments of this invention, in its intermediate product composition aspect, are then converted to the tangible embodiments of this invention, in its final product composition aspect, by treatment with an acid forming catalyst such as, for example, thionyl chloride, phosphorus pentachloride, boron trifluoride and the like, at room temperature in the presence of an inert non-hydroxylic solvent such as, for example, chloroform, benzene, toluene, xylene, carbon disulfide and the like. Following decomposition of excess acid forming catalyst, the product is obtained by conventional precipitation and crystallization procedures.

In accordance with the second process aspect of this invention, the o-amino-benzhydrol starting material is converted directly to the tangible embodiments of this invention, in its final product composition aspect, by treatment at room temperature with phosgene in the presence of an inert non-hydroxylic solvent such as, for example, chloroform. The product of the reaction is recovered by conventional techniques of precipitation and crystallization.

The tangible embodiments of this invention, in its final product composition aspect, as free bases, may be combined with conventional diluents and carriers to form such dosage forms as tablets, capsules, solutions, suspensions, suppositories and the like.

The best mode contemplated by th einventor for carrying out his invention will now be set forth in the following examples:

The following example illustrates the preparation of the tangible embodiments of this invention, in its intermediate and final product composition aspect, in accordance with the first process aspect of the invention:

EXAMPLE 1

(a) o-Carbobenzoxamido-benzhydrol

To a two-phase mixture consisting of a solution of potassium carbonate (10 g.) in water (100 ml.) and a solution of o-aminobenzhydrol (15.0 g., 0.08 mole) in dichloromethane (225 ml.) is added a solution of carbobenzoxychloride (11.9 g., 0.07 mole). The reaction mixture is stirred for two hours during which the temperature rises from an initial 0° C. to room temperature. The two phases are separated. The organic solvent phase is washed with water, dried over anhydrous magnesium sulfate and evaporated to an oil. This is taken up in ethanol and 22.1 g. (91%) crystalline product, M.P. 91–93° C., obtained.

(b) 4-phenyl-4H-3,1-benzoxazine-2-one

The o-carbobenzoxamido-benzhydrol (12 g., 0.036 mole) in methylene dichloride (50 ml.) is cooled to 0° C. and thionyl chloride (4 ml.) is added. The reaction mixture is allowed to stir for two hours. The mixture is then poured into an aqueous solution of potassium carbonate to take up the excess thionyl chloride. The phases are separated. The organic phase is washed, dried over anhydrous magnesium sulfate and evaporated to dryness to give 4 g. (49%) of a crystalline product, M.P. 185–189° C.

*Analysis.*—Calculated for $C_{14}H_{11}NO_2$: C, 74.65%; H, 4.92%; N, 6.22%. Found: C, 74.69%; H, 5.00%; N, 6.05%.

The following example illustrates the preparation of the tangible embodiments of this invention, in its final product composition aspect, in accordance with the second process aspect of the invention:

EXAMPLE 2

4-phenyl-4H-3,1-benzoxazine-2-one

Into a solution of o-aminobenzhydrol (14 g., 0.07 mole) in chloroform (200 ml.) is bubbled an excess of phosgene gas. The phosgene is passed through the solution for 30 minutes and the solution then evaporated to give an oil which upon washing with water yields 10 g. (71%) of white plates, M.P. 182–184° C.

The subject matter which the applicant regards as his invention is particularly pointed out and distinctly claimed as follows.

I claim:
1. 4-phenyl-4H-3,1-benzoxazine-2-one.
2. o-Carbobenzoxamidobenzhydrol.
3. A method of preparing 4-phenyl-4H-3,1-benzoxazine-2-one which comprises treating o-aminobenzhydrol with carbobenzoxy chloride in the presence of alkali and treating the resulting product with an acid forming catalyst.
4. A method according to claim 3 wherein said acid forming catalyst is thionyl chloride.
5. A method of preparing 4-phenyl-4H-3,1-benzoxazine-2-one which comprises treating o-aminobenzhydrol with phosgene.

No references cited.

WALTER A. MODANCE, *Primary Examiner.*

ROBERT T. BOND, *Assistant Examiner.*